United States Patent
Schimion et al.

[11] Patent Number: 5,683,581
[45] Date of Patent: Nov. 4, 1997

[54] BELT-TYPE FILTER APPARATUS FOR REMOVING FOREIGN PARTICLES FROM LIQUID BATHS

[75] Inventors: Werner Schimion; Hubert Jung, both of Hilchenbach, Germany

[73] Assignee: SMS Schloemann-Siemag Aktiengesellschaft, Düsseldorf, Germany

[21] Appl. No.: 555,364

[22] Filed: Nov. 8, 1995

[30] Foreign Application Priority Data

Nov. 9, 1994 [DE] Germany .......... 44 39 944.8

[51] Int. Cl.⁶ .......................................... B01D 33/048
[52] U.S. Cl. .................. 210/386; 210/387; 210/391; 210/401; 210/404
[58] Field of Search .............................. 210/386, 387, 210/391, 393, 396, 400, 401, 402, 404

[56] References Cited

U.S. PATENT DOCUMENTS

| | | | |
|---|---|---|---|
| 1,966,626 | 7/1934 | Henry | 210/400 |
| 2,073,384 | 3/1937 | Barnebl | 210/402 |
| 3,373,877 | 3/1968 | Stewart et al. | 210/402 |
| 3,754,661 | 8/1973 | Palmer et al. | 210/401 |
| 4,826,596 | 5/1989 | Hirs | 210/387 |
| 4,919,825 | 4/1990 | Croket | 210/387 |
| 4,935,138 | 6/1990 | Gandfrin | 210/461 |
| 5,112,485 | 5/1992 | Hirs | 210/400 |
| 5,417,850 | 5/1995 | Schimion et al. | 210/401 |

FOREIGN PATENT DOCUMENTS

| | | |
|---|---|---|
| 0407363 | 1/1991 | European Pat. Off. |
| 0512288 | 11/1992 | European Pat. Off. |
| 2639493 | 7/1978 | Germany |

*Primary Examiner*—Christopher Upton
*Attorney, Agent, or Firm*—Friedrich Kueffner

[57] ABSTRACT

A belt-type filter apparatus for removing foreign particles from liquid baths includes a basin containing the liquid, a filter belt which is constructed as an endless perforated circulating support belt and/or a filter belt fleece which can be wound from a roller and may be placed on the circulating support belt, a low pressure chamber with intake openings arranged in the basin and connected to devices for producing negative pressure, and guide rollers which act on the support belt and/or filter belt fleece in such a way that the support belt and/or filter belt fleece are introduced from the top into the basin, are conducted over the intake openings of the low pressure chamber and are then conveyed toward the top out of the basin. The low pressure chamber is composed of a cylindrical drum which is mounted in the basin so as to be rotatable about a horizontal axis. The interior of the cylindrical drum forms the low pressure chamber and the cylindrical wall of the drum has the intake openings. The support belt and/or the filter belt fleece can be placed on the cylindrical wall.

15 Claims, 3 Drawing Sheets

BELT-TYPE FILTER APPARATUS FOR REMOVING FOREIGN PARTICLES FROM LIQUID BATHS

BACKGROUND OF THE INVENTION

1. Field of the Invention

The present invention relates to a belt-type filter apparatus for removing foreign particles from liquid baths. The apparatus includes a basin containing the liquid, a filter belt which is constructed as an endless perforated circulating support belt and/or a filter belt fleece which can be wound from a roller and may be placed on the circulating support belt, a low pressure chamber with intake openings arranged in the basin and connected to devices for producing negative pressure, and guide rollers which act on the support belt and/or filter belt fleece in such a way that the support belt and/or filter belt fleece are introduced from the top into the basin, are conducted over the intake openings of the low pressure chamber and are then conveyed toward the top out of the basin.

2. Description of the Related Art

Various embodiments of belt-type filter apparatus of the above-described type are known in the art. The most difficult problem occurring in the construction and operation of such apparatus has been found to be the guidance of the support belt or the combination of support belt and filter belt fleece placed on the support belt over the intake openings of the low pressure chamber and the sealing means in front of, behind, and to the side of the intake openings. The guidance is made more difficult by the necessity to move the support belt and possibly the filter belt fleece resting on the support belt above the intake openings over a plane surface with a contact pressure which is effective over the entire contact surface and to limit the relatively large frictional resistance which results from the relatively large surface contact, so that tearing of the support belt and the filter belt fleece is prevented and, as already mentioned, to ensure that the moving parts, particularly in the direction of movement laterally of the intake openings, are properly sealed during the standstill as well as during the movement of these parts. In addition, the frictional resistance is to limited in order to prevent floating of the filter belt fleece during the movement as well as during the standstill of the fleece as well as when the negative pressure disappears or is switched off.

It has been attempted in the past to prevent these difficulties by arranging slide rails above the intake openings as suggested in U.S. Pat. No. 3,704,787. Mechanical contact pressure devices for the side edges for the support belt and/or the filter belt fleece have been suggested in European Application 407,363. The arrangement of contact pressure devices in front of and behind the intake openings was suggested in European Application 512,288. Additional contact belts to be placed on the support belt and/or the filter belt fleece are disclosed in U.S. Pat. Nos. 3,087,620 and 4,062,780.

However, the realization of all of these proposals was technically very difficult and subject to interruptions and wear, without finally solving the problem discussed above.

SUMMARY OF THE INVENTION

Therefore, it is the primary object of the present invention to provide a belt-type filter apparatus of the above-described type in which the problem discussed above is solved and the difficulties occurring in the previously developed embodiments are avoided.

In accordance with the present invention, the low pressure chamber is composed of a cylindrical drum which is mounted in the basin so as to be rotatable about a horizontal axis, wherein the interior of the cylindrical drum forms the low pressure chamber and wherein the cylindrical wall of the drum has the intake openings and wherein the support belt and/or the filter belt fleece can be placed on the cylindrical wall.

In the configuration of the low pressure chamber and the arrangement of the intake openings on the circumference of the cylindrical drum, the problems described above disappear simply because no relative movement occurs between the cylindrical wall of the drum and the support belt and filter belt fleece during the movement of the support belt or the combination of support belt and filter belt fleece placed on the support belt together with the cylindrical drum in the basin. The support belt and the filter belt fleece are tensioned around the circumference of the cylindrical drum by an appropriate arrangement of the guide rollers and, thus, floating of the support belt or the filter belt fleece is prevented when the drum stands still or the negative pressure disappears.

In accordance with a further development of the present invention, a pair of guide rollers is arranged above the cylindrical drum at a small distance from each other and from the circumference of the cylindrical drum for guiding the support belt and/or the filter belt fleece toward the cylindrical wall of the drum and away from the cylindrical wall of the drum.

In addition, another feature of the present invention provides that a stationary sealing cover is mounted so as to rest with its edges on the cylindrical wall of the drum, wherein the sealing cover may extend between the two guide rollers of the pair of guide rollers. The sealing cover may have a triangular cross section, wherein the side of the sealing cover facing the guide roller which serves to guide the support belt away from the cylindrical drum forms a guide surface extending to the upper opening of the basin for the support belt or filter belt fleece being conveyed out of the basin.

The belt-type filter apparatus according to the present invention may include an endless circulating support belt to which rod members of a magnetic material are attached, wherein the rod members are arranged one after the other in travel direction of the circulating belt and extend transversely of the direction of movement. In that case, additional guide rollers may be provided for the circulating belt outside and within the basin for introducing the circulating belt into the basin, for placing the circulating belt onto the support belt and/or the filter belt fleece and for guiding the circulating belt together with the support belt and/or the filter belt fleece around the cylindrical wall of the drum. It is also possible to guide the circulating belt together with the support belt and/or the filter belt fleece toward the cylindrical wall of the drum and away from the cylindrical wall of the drum. It is additionally possible to guide the circulating belt, after it has been guided away from the cylindrical wall of the drum, over separate guide rollers at a distance from the cylindrical wall of the drum and underneath the cylindrical drum and then toward the top out of the basin.

Above the upper opening of the basin, the circulating belt may be guided through a cleaning unit for the rod members. Moreover, in accordance with another feature, a guide roller may be provided in travel direction of the support belt in front of that guide roller of the pair of guide rollers which guides the support belt toward the cylindrical wall of the drum; also, between the additional guide roller and the guide roller for guiding the support belt toward the cylindrical wall of the drum, a drive roller may be provided for the filter belt fleece resting against the support belt, wherein the drive roller can be pressed against the upper side of the support belt. In that case, it is also possible to guide the support belt in the conventional manner above the upper opening of the basin through a cleaning unit for the perforations of the belt.

In accordance with another embodiment of the present invention, the cylindrical drum has a tubular hub which is mounted on a cylindrical shaft connected to the device for producing the negative pressure, wherein the wall of the cylindrical shaft has inlet openings in its lateral and lower circumferential areas, and wherein intermediate walls forming sector chambers are arranged between the outer wall of the tubular hub and the inner wall of the cylindrical wall of the drum and liquid outlet openings are arranged in the tubular hub between the intermediate walls.

In accordance with another feature of the invention, the tubular hub may be mounted, on the one hand, on a unilaterally closed, cup-shaped pipe piece which is fixedly connected to the basin and has the liquid inlet openings, and, on the other hand, the other end of the tubular hub is mounted on an also stationary pin. In that case, the present invention provides that an endless support belt guided by guide rollers into the basin and out of the basin can be placed against the filter belt fleece which rests against the cylindrical wall of the drum. Finally, the cylindrical wall of the drum may be perforated in the manner of a screen.

The belt-type filter apparatus according to the present invention can be operated optionally with a support belt perforated in the manner of a screen without a filter belt fleece, or also with the support belt and a filter belt fleece placed on the support belt; in special cases, when only foreign particles of metal must be removed from the liquid, it is possible to let the cylindrical drum rotate only with the circulating belt and the rod members of magnetic material connected to the circulating belt.

In the embodiment in which the interior of the cylindrical drum is divided into sector chambers, and in which a screen-like cylindrical wall of the drum is provided and the combination of outlet openings in the tubular hub and the inlet openings in the cylindrical shaft positioned for certain circumferential areas so as to act as a rotary valve, the intake action can be limited to a certain circumferential area, i.e., the lower circumferential area of the cylindrical drum, so that it is possible to place only a filter belt fleece on the cylindrical wall of the drum because, in that case, the belt-type filter apparatus according to the invention can be operated without a sealing cover of the upper portion between the two guide rollers.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
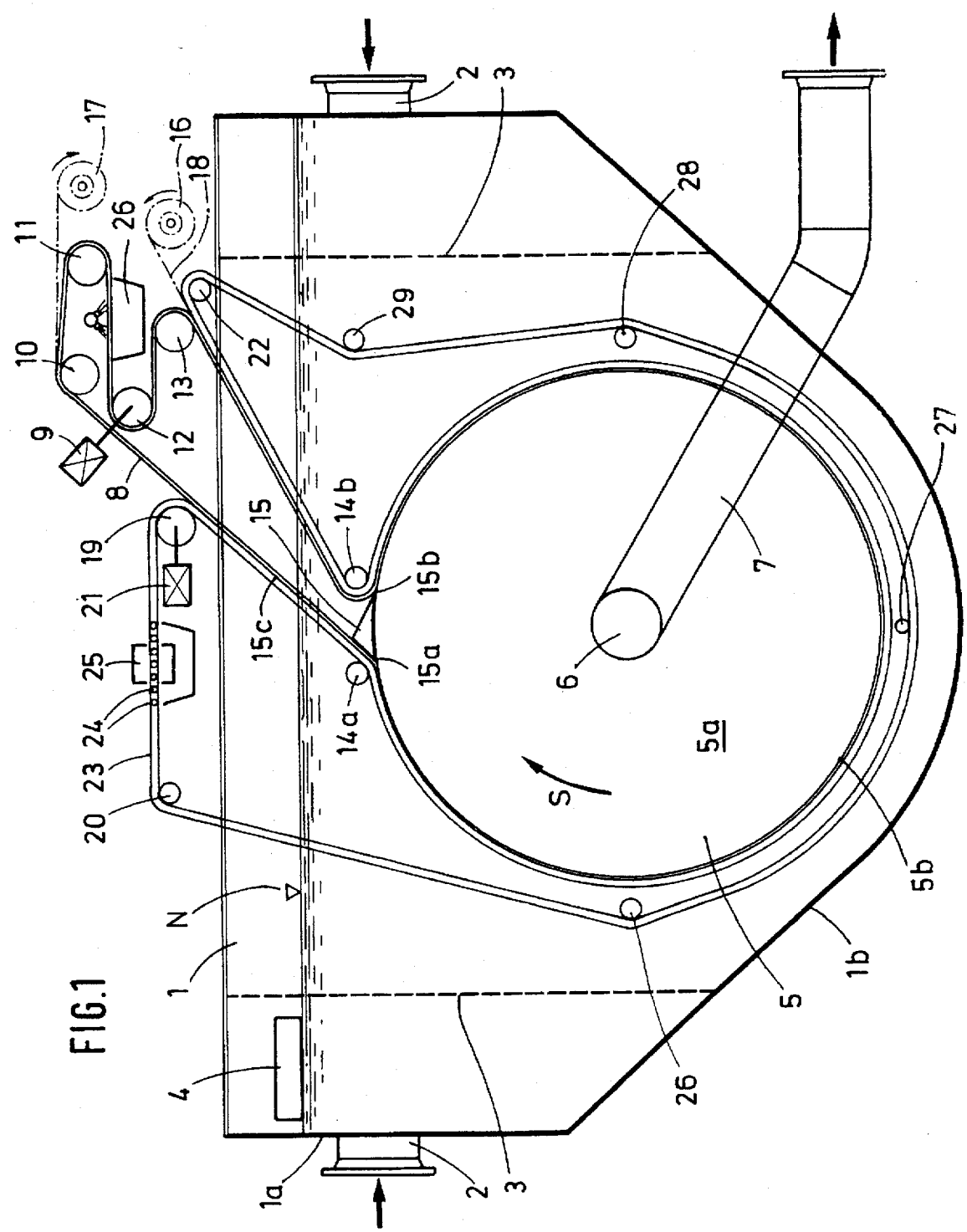
FIG. 1 is a schematic sectional view of the belt-type filter apparatus according to the present invention.

As illustrated in FIG. 1 of the drawing, the basin 1 includes a rectangular upper portion 1a and a trough-like lower portion 1b. Inlet pipe pieces 2 for the liquid containing the foreign particles are arranged in oppositely located side walls of the upper portion 1a. Vertically extending coarse screens 3 are arranged behind each of the inlet pipe pieces 2. These coarse screens 3 simultaneously act as flow distributors. An overflow 4 regulates the level N of the liquid in the basin 1.

The cylindrical drum 5 is mounted in the basin 1 so as to be rotatable about a cylindrical shaft 6 which extends between the side walls of the trough-shaped lower portion 1b of the basin 1. The cylindrical drum 5 has closed side walls 5a and a cylindrical wall 5b with liquid passage openings, not shown, which are, for example, in the form of a regular perforation. A suction tube 7 extending out of the basin 1 is connected to the cylindrical shaft 6. The suction tube 7 is connected to a device, not shown, for producing a negative pressure and ends in the interior of the cylindrical drum 5.

A number of guide roller 10, 11, 12 and 13 for an endless support belt 8 are arranged above the basin 1. Of these rollers, the guide roller 12 is connected to a motor 9. Underneath the liquid level N within the basin 1, a pair of guide rollers consisting of the guide rollers 14a and 14b is arranged at a small, adjustable distance from the cylindrical wall 5b, wherein the relatively small distance between the guide rollers 14a and 14b can also be adjusted. These guide rollers 10, 11, 12, 13 and 14a, 14b serve to guide the endless support belt 8 into the basin 1, around the cylindrical wall 5b and then again out of the basin 1.

A stationary sealing cover 15, which has a triangular cross section in the illustrated embodiment, is mounted between the two guide rollers 14a and 14b. The sealing cover 15 is sealed laterally relative to the cylindrical wall 5b and forms a closed sealing surface extending across the respective cylindrical segment and resting with its edges 15a and 15b on the cylindrical wall 5b. In the illustrated embodiment, the sealing cover 15 forms a support surface for the support belt 8 with a sealing cover surface 15c which, in the illustrated embodiment, faces the guide roller 14a and is extended upwardly toward the upper opening of the basin 1 above the level N of the liquid.

As shown in dash-dot lines, a supply roll 16 for the filter belt fleece 18, also shown in dash-dot lines, and a take-up roll 17 for the used filter belt fleece 18 may be arranged outside of the basin 1. The filter belt fleece 18, which is wound from the supply roll 16 in the direction of the arrow shown next to the supply roll 16, is introduced into the basin 1 by traveling past the guide roller 13 which places the support belt 8 against the filter belt fleece 18 and over the guide roller 14b. Together with the support belt 8, the filter belt fleece 18 then travels around the cylindrical wall 5b, around the guide roller 14a out of the basin 1, and over the guide roller 10 onto the take-up roll 17.

Additional guide rollers 19 and 20 can be arranged above the basin 1, wherein one of the guide rollers 19 and 20 is connected to a motor. In the illustrated embodiment, the guide roller 19 is connected to a motor 21. Another guide roller 22 may be arranged underneath the guide roller 13, wherein the support belt 8, or the support belt 8 and the filter belt fleece 18 placed on the support belt 8, travel on the guide roller 13.

A circulating belt 23 and the support belt 8, or the circulating belt 23 and the support belt 8 with the filter belt fleece 18 placed on the support belt 8, travel around the guide roller 22, and around the cylindrical wall 5b of the drum 5. The circulating belt 23 has rod members 24 of magnetic material which are arranged transversely of and one behind the other in travel direction of the circulating belt. After having been guided around the cylindrical wall 5b of the drum 5, the circulating belt 23 is guided over the guide roller 14a out of the basin 1 and between the guide rollers 19 and 20 through a cleaning unit for the rod members 24, and over the guide roller 20 and additional guide rollers 26, 27, 28, 29 under the cylindrical drum 5 and back to the guide roller 22, wherein the additional guide rollers 26, 27, 28, 29 are arranged in the basin 1 at a distance from the cylindrical drum 5.

The belt-type filter apparatus described above can be operated with only a perforated support belt 8. In that case, the cylindrical drum 5 rotates continuously with the support belt 8 placed on the drum 5. The foreign particles become attached to the outer surface of the support belt 8. The support belt 8 is guided around the guide roller 14a and then out of the basin 1 over the guide rollers 10, 11 and 12. Between the guide rollers 11 and 12, the support belt 8 is moved through a cleaning unit 26 in which the foreign particles are removed from the support belt 8. The support belt 8 is then guided back again over the guide rollers 13 and 14b onto the circumferential wall 5b of the drum 5 and is again guided around the drum 5.

The above-described belt-type filter apparatus can also be operated in such a way that, by means of the guide roller 22 and the guide roller 13 which can placed against the support belt 8, the filter belt fleece 18 which is unwound from the supply roll 16 is placed onto the support belt 8 and is guided together with the support belt 8 around the guide roller 14b onto the cylindrical wall 5b of the drum 5, around the guide roller 14a and around the guide roller 10 back out of the basin 1 toward the take-up roll 17. In that case, the cylindrical drum 5 with the support belt 8 and with the portion of the filter belt fleece 18 placed on the cylindrical drum 5, carries out only one full rotation at a time and is only rotated again when sufficient foreign particles have collected on the portion of the filter belt fleece 18 placed on the circumferential wall 5b of the drum 5, i.e., the drum 5 is rotated when a predetermined differential pressure has been built up between the liquid in the basin 1 and the interior of the cylindrical drum 5 which makes it necessary to place a fresh portion of the filter belt fleece 18 on the cylindrical wall 5b of the drum 5. As already described, the portion of the filter belt fleece 18 containing the foreign particles is then guided over the guide rollers 14a and 10 to the take-up roll 17. In this type of operation, the support belt 8 does not have to be moved through the cleaning unit 26. If the apparatus is used only for this type of operation, the cleaning unit 26 can be omitted.

If the liquid contains foreign particles which can be attracted and removed magnetically, the circulating belt 23 with the rod members 24 of magnetic material can be placed against the support belt 8, or against the filter belt fleece 18 placed against the support belt 8 in the manner already described above. Together with the support belt 8 and possibly the filter belt fleece 18, the circulating belt 23 is guided around the cylindrical wall 5 of the drum 5 through the basin 1 and through the cleaning unit 25. It is also possible to guide only this circulating belt 23 through the basin 1 in the manner described above; in that case, the circulating belt 23 may be moved continuously or discontinuously.

In all types of operation described above, a sealing cover 15 sealingly closes the gap between the guide rollers 14a and 14b through which the liquid in the basin 1 which contains foreign particles could penetrate unfiltered into the interior of the filter drum 5.

Figure 2:
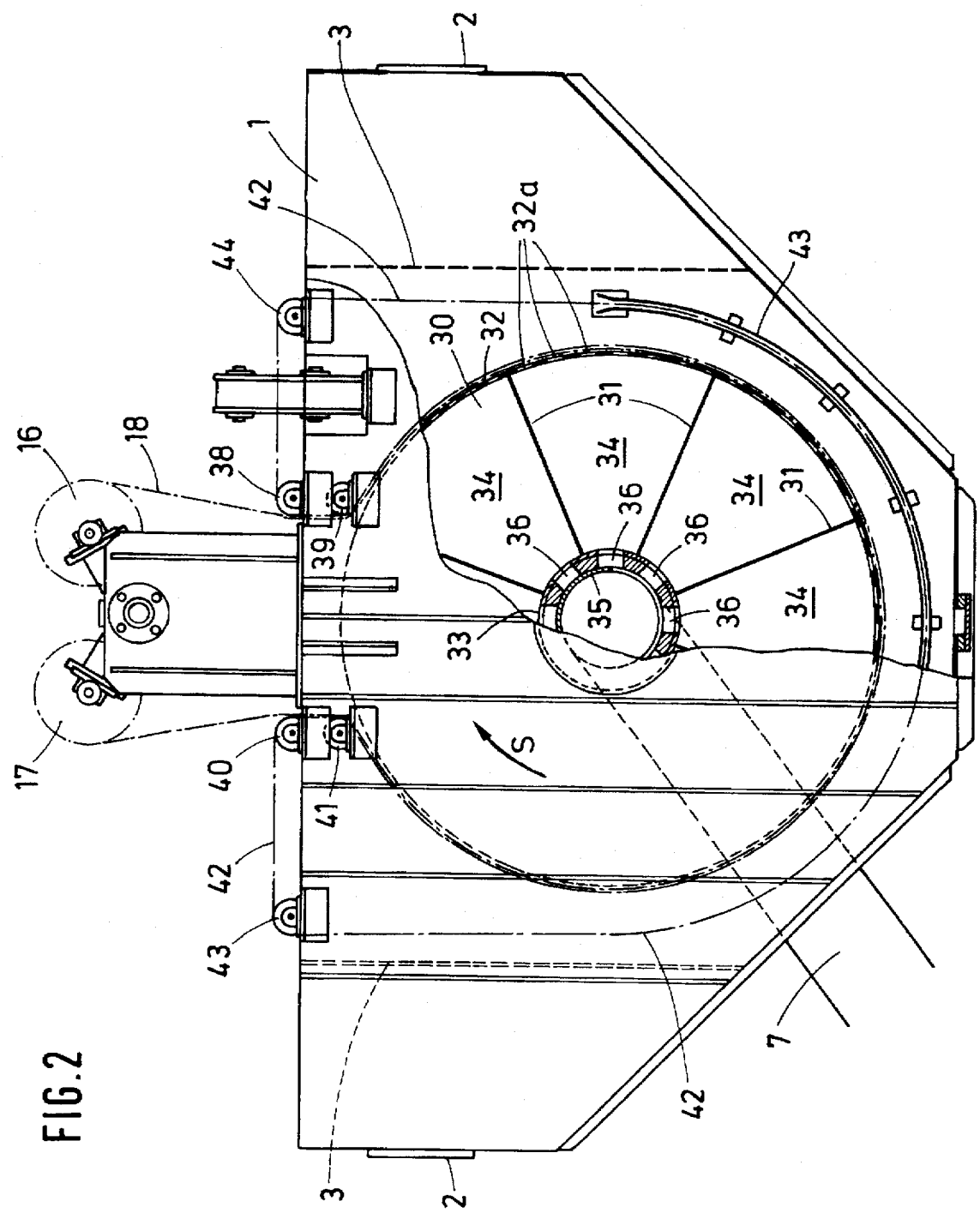
FIG. 2 is a sectional view, similar to FIG. 1, of another embodiment of the belt-type filter apparatus according to the present invention.

In the embodiment of the invention shown in FIG. 2, the cylindrical drum 30 has in the interior thereof radial intermediate walls 31 which form a number of equal sector chambers 34. The intermediate walls 31 are attached to the inner surface of the cylindrical wall 32 of the drum 30 and end at the periphery of a tubular hub 33. The tubular hub 33 is mounted on a stationary tubular shaft 35 and has a plurality of liquid outlet openings 36 between the intermediate walls 31 located adjacent to each other. The tubular shaft 31, on the other hand, is provided in its lower circumferential portion with a liquid inlet opening 37. In the same manner as described in connection with FIG. 1, the tubular shaft 35 is connected to a device for producing negative pressure, not shown, through a suction pipe 7, shown in broken lines in FIG. 2. As is the case in the embodiment of FIG. 1, a filter belt fleece 18, shown in dash-dot lines, can be wound from the supply roll 16 and can be guided by means of the guide rollers 38, 39 and 40, 41 onto the cylindrical wall 32 of the drum 30 which is provided with perforation openings 32a; the filter belt fleece 18, on which the foreign particles have been deposited, can then be returned to the take-up roll 17.

Similar to the embodiment of FIG. 1, an endless circulating chain 42 can be placed onto the filter belt fleece 18 which rests on the cylindrical wall 32 of the drum 30. The endless circulating chain 42 is guided by the guide rollers 38, 39 and 40, 41 and by additional guide rollers 43, 44 out of the basin 1 and back into the basin 1. The return of the circulating chain 42 takes place within the basin 1 through one or two guide rails 43 which are arranged spaced from and concentrically relative to the cylindrical drum 30. The circulating chain 42 may be equipped with rod-shaped members which extend transversely of the travel direction of circulating chain 42 and extend across the width of the cylindrical drum 30. The rod members may be of a magnetic material.

Figure 3:
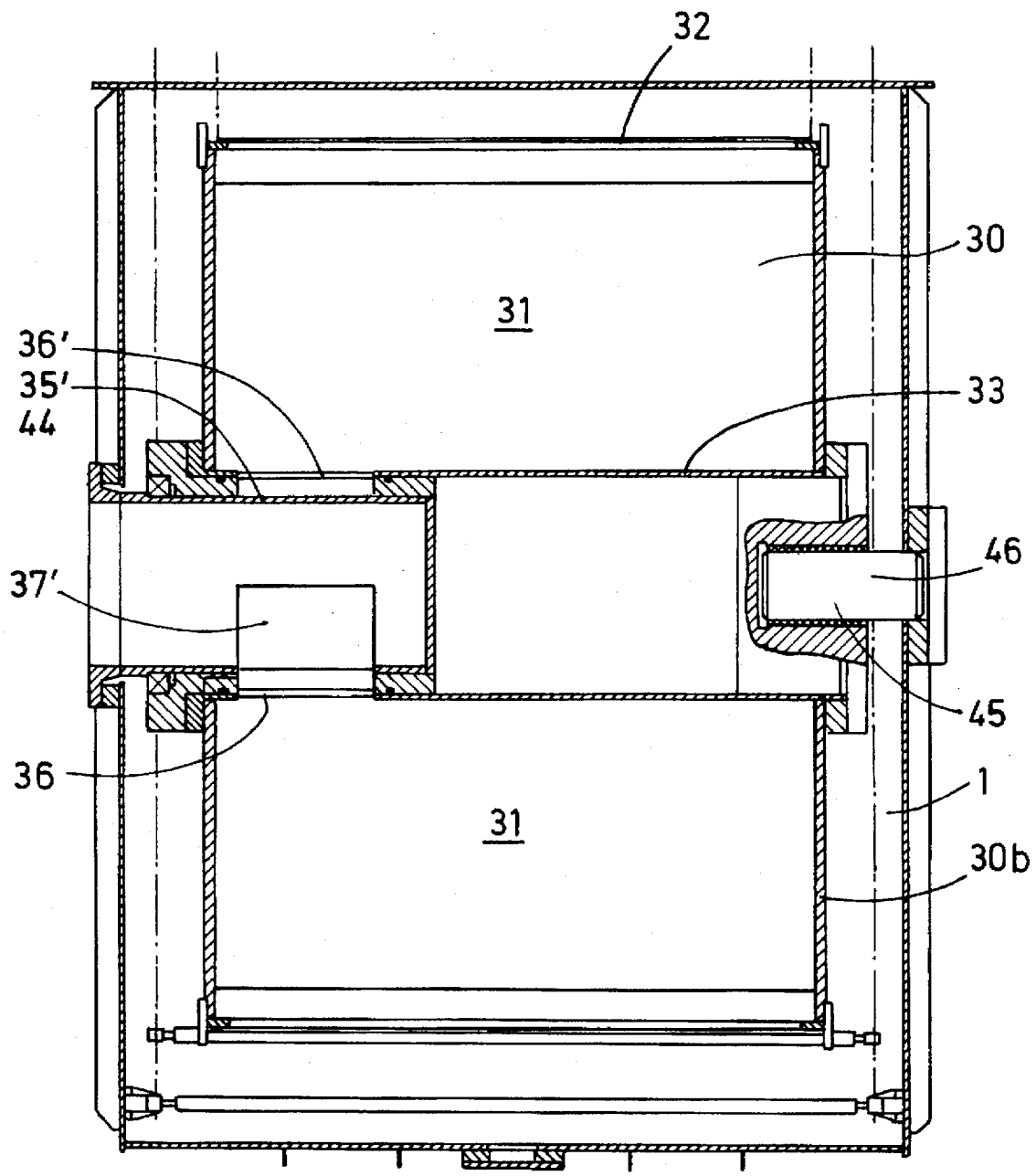
FIG. 3 is a sectional view, on a larger scale, of a detail of the apparatus of FIG. 2.

In the embodiment according to FIG. 3, the tubular shaft is constructed as a cup-shaped pipe piece 35' which is fixedly connected to the basin and which is open toward the outside and is closed toward the inside. The tubular hub 33 of the cylindrical drum 30 rests on the pipe piece 35' on one side in bearings 44. On the other side, the cylindrical drum 30 is mounted with a bushing 45 on a bearing pin 46 which is fixedly connected to the basin. As is the case in the embodiment of FIG. 2, the cup-shaped pipe piece 35' has in its lower area a liquid inlet opening 37' and the tubular hub 33 has liquid outlet openings 36' corresponding to the liquid inlet openings 37'.

In contrast to the embodiment of FIG. 1, the space between the guide rollers 39 and 41, which correspond to the guide rollers 14b, 14a of the embodiment of FIG. 1, does not have to be sealed off in order to prevent the uncleaned liquid which still contains foreign particles to penetrate into the drum, if, as a result of the division of the cylindrical drum 30 into sector chambers 34 and the rotary valve-like interaction of the liquid outlet openings 36 or 36' of the tubular hub 33 with the liquid inlet openings 37 or 37' of the tubular shaft 35 or the cup-shaped pipe piece 35', the suction effect produced by the negative pressure device is effective only in those sector chambers 34 whose corresponding portion of the cylindrical wall 32 is already covered by the filter belt fleece 18 which is placed onto the cylindrical wall 32 by the guide roller 39. The endless circulating chain 42 placed onto the filter belt fleece prevents floating of the filter belt fleece 18 in those areas of the cylindrical wall in which the corresponding sector chambers 34 are not yet connected through their liquid outlet openings 36 with the negative pressure device.

While specific embodiments of the invention have been shown and described in detail to illustrate the inventive principles, it will be understood that the invention may be embodied otherwise without departing from such principles.

We claim:

1. A belt-type filter apparatus for removing foreign particles from liquid baths, the apparatus comprising a basin containing the liquid, a filter belt constructed as an endless perforated support belt, a cylindrical drum mounted in the basin so as to be rotatable about a horizontal axis, the cylindrical drum having a cylindrical wall with intake openings, the cylindrical drum having an interior forming a low pressure chamber, the low pressure chamber being in communication with devices for producing negative pressure, and a plurality of guide rollers for guiding the support belt into the basin, around the cylindrical drum over the intake openings of the cylindrical drum and out of the basin, wherein the cylindrical drum comprises a tubular hub, intermediate walls forming radial sector chambers being mounted between an outer wall of the tubular shaft and the cylindrical wall of the cylindrical drum, further comprising a cylindrical shaft, the tubular hub being mounted on the cylindrical shaft, the cylindrical shaft having a wall provided in a lower circumferential portion with liquid inlet openings, and wherein the tubular hub has liquid outlet openings between the intermediate walls, wherein the liquid inlet openings of the cylindrical shaft are positioned such that the devices for producing negative pressure are in communication through a rotary valve-like interaction of the liquid outlet openings of the tubular hub and the liquid inlet openings of the tubular shaft with the sector chambers whose cylindrical wall portions are covered by the support belt.

2. The belt-type filter apparatus according to claim 1, further comprising a filter belt fleece, the filter belt fleece being wound from a roller and being guided by the plurality of guide rollers into the basin, around the cylindrical drum and out of the basin together with the support belt.

3. The belt-type filter apparatus according to claim 2, comprising an endless circulating belt traveling in a travel direction, the circulating belt comprising a plurality of rod members of a magnetic material extending transversely of the travel direction, further comprising a plurality of additional guide rollers for guiding the circulating belt into the basin, onto the support belt traveling around the cylindrical wall of the cylindrical drum, and out of the basin, further comprising means for guiding the circulating belt together with the support belt and the filter belt fleece against the cylindrical wall and away from the cylindrical wall.

4. The belt-type filter apparatus according to claim 1, wherein the plurality of guide rollers include first and second adjustable guide rollers mounted above the cylindrical drum at a slight distance between each other and from the cylindrical wall of the cylindrical drum, wherein the first adjustable guide roller serves to guide the support belt against the cylindrical wall of the cylindrical drum and the second adjustable guide roller serves to guide the support belt away from the cylindrical wall of the cylindrical drum.

5. The belt-type filter apparatus according to claim 4, comprising a stationary sealing cover having edges, the stationary sealing cover being mounted between the first and second adjustable guide rollers, the edges of the sealing cover being in contact with the cylindrical wall of the cylindrical drum.

6. The belt-type filter apparatus according to claim 5, wherein the sealing cover has a triangular shape and includes a side facing the second adjustable roller for guiding the support belt away from the cylindrical wall of the cylindrical drum, an extension being connected to the side of the sealing cover, the extension extending to an upper opening of the basin for supporting the support belt traveling out of the basin.

7. The belt-type filter apparatus according to claim 4, comprising a filter belt fleece, the filter belt fleece being wound from a roller and being guided by the plurality of guide rollers into the basin, around the cylindrical drum and out of the basin together with the support belt, further comprising a further guide roller mounted in front of the first adjustable guide roller in travel direction of the support belt for guiding the support belt toward the first adjustable guide roller, and a drive roller arranged between the first adjustable guide roller and the further guide roller for driving the filter belt fleece in contact with the support belt, wherein the drive roller is pressable against an upper side of the support belt.

8. The belt-type filter apparatus according to claim 1, further comprising an endless circulating belt traveling in a travel direction, the circulating belt comprising a plurality of rod members of a magnetic material extending transversely of the travel direction, further comprising a plurality of additional guide rollers for guiding the circulating belt into the basin, onto the support belt traveling around the cylindrical wall of the cylindrical drum, and out of the basin.

9. The belt-type filter apparatus according to claim 8, comprising separate guide rollers for guiding the circulating belt away from the cylindrical wall of the cylindrical drum, underneath the cylindrical wall of the cylindrical drum and toward the top out of the basin.

10. The belt-type filter apparatus according to claim 9, comprising a cleaning device for the rod members of the circulating belt, the cleaning device being mounted above an upper opening of the basin, wherein the circulating belt is guided through the cleaning device.

11. The belt-type filter apparatus according to claim 1, further comprising a cleaning device for cleaning perforations of the support belt, the support belt being guided through the cleaning device above an upper opening of the basin.

12. The belt-type filter apparatus according to claim 1, wherein the tubular hub is mounted on a unilaterally closed, cup-shaped pipe piece provided with the liquid inlet openings and fixedly connected to the basin, and wherein the tubular hub is additionally mounted with a sleeve on a bearing pin fixedly connected to the basin.

13. The belt-type filter apparatus according to claim 1, wherein the cylindrical wall of the cylindrical drum has screen-like perforations.

14. The belt-type filter apparatus according to claim 1, comprising a filter belt fleece, the filter belt fleece being wound from a roller and being guided by the plurality of guide rollers into the basin, around the cylindrical drum and out of the basin together with the support belt, further comprising an endless circulating chain having rod members arranged transversely of a travel direction of the circulating chain and covering a width of the cylindrical drum, the circulating chain being guided by the plurality of guide rollers into the basin, against the filter belt fleece in contact with the cylindrical wall of the cylindrical drum, and out of the basin.

15. The belt-type filter apparatus according to claim 14, wherein the rod members are of a magnetic material.

* * * * *